(12) United States Patent
Wick et al.

(10) Patent No.: US 11,307,079 B2
(45) Date of Patent: Apr. 19, 2022

(54) DEVICE FOR DETERMINING THE WEIGHT OF A CAPSULE ARRANGED IN A CAPSULE HOLDER OF AN INCREMENTALLY ROTATED CONVEYOR WHEEL

(71) Applicant: Syntegon Technology GmbH, Waiblingen (DE)

(72) Inventors: Wolfgang Wick, Remseck (DE); Werner Runft, Winnenden (DE)

(73) Assignee: Syntegon Technology GmbH, Waiblingen (DE)

( * ) Notice: Subject to any disclaimer, the term of this patent is extended or adjusted under 35 U.S.C. 154(b) by 46 days.

(21) Appl. No.: 16/959,215

(22) PCT Filed: Nov. 20, 2018

(86) PCT No.: PCT/EP2018/081908
§ 371 (c)(1),
(2) Date: Jun. 30, 2020

(87) PCT Pub. No.: WO2019/134770
PCT Pub. Date: Jul. 11, 2019

(65) Prior Publication Data
US 2020/0408585 A1 Dec. 31, 2020

(30) Foreign Application Priority Data
Jan. 4, 2018 (DE) .................... 10 2018 200 068.9

(51) Int. Cl.
  *G01G 15/00* (2006.01)
  *G01G 17/00* (2006.01)
  *A61J 3/07* (2006.01)
(52) U.S. Cl.
  CPC ............ *G01G 15/006* (2013.01); *A61J 3/074* (2013.01); *G01G 17/00* (2013.01); *A61J 2200/74* (2013.01)

(58) Field of Classification Search
  CPC ....... G01G 15/006; G01G 17/00; A61J 3/074; A61J 2200/74
  See application file for complete search history.

(56) References Cited

U.S. PATENT DOCUMENTS 7,140,403 B2 * 11/2006 Gamberini ............. A61J 3/074
                                                                    141/83
9,995,618 B2 *  6/2018 Boehringer ............. G01G 7/06
(Continued)

FOREIGN PATENT DOCUMENTS

CN          101303252 A      11/2008
CN          102573757 A       7/2012
(Continued)

OTHER PUBLICATIONS

International Search Report for Application No. PCT/EP2018/081908 dated Mar. 9, 2019 (English Translation, 2 pages).
(Continued)

*Primary Examiner* — Randy W Gibson
(74) *Attorney, Agent, or Firm* — Michael Best & Friedrich LLP (57) ABSTRACT

The invention relates to a device (50; 50a to 50c) for determining the weight of a capsule (10) arranged in a receptacle (26) of a capsule holder (25) of an incrementally rotated conveyor wheel (21), comprising a transfer device (52; 52a to 52c) for transferring at least one capsule (10) from the capsule holder (25) into a capsule receiver (55) having a plurality of receptacles (54) for respectively one capsule (10), and back again, wherein the capsule receptacle (55) has a movable arrangement in a plane parallel to the conveyor plane of the conveyor wheel (21).

14 Claims, 7 Drawing Sheets

(56) References Cited

U.S. PATENT DOCUMENTS

| | | | | |
|---|---|---|---|---|
| 11,047,727 B2* | 6/2021 | Trebbi | ............... | G01G 15/00 |
| 2003/0019797 A1* | 1/2003 | Yamamoto | ............ | G01G 23/01 |
| | | | | 209/592 |
| 2005/0230000 A1* | 10/2005 | Gamberini | ............. | A61J 3/074 |
| | | | | 141/83 |
| 2008/0219803 A1 | 9/2008 | Runft et al. | | |
| 2015/0204714 A1* | 7/2015 | Boehringer | ............ | G01G 17/00 |
| | | | | 53/281 |
| 2019/0178700 A1* | 6/2019 | Trebbi | ............... | B65G 47/90 |

FOREIGN PATENT DOCUMENTS

| | | |
|---|---|---|
| CN | 104507442 A | 4/2015 |
| DE | 102005057393 | 5/2007 |
| EP | 1582193 | 7/2007 |
| EP | 2389919 | 11/2011 |
| GB | 2269354 | 2/1994 |
| JP | 6264702 | 3/1987 |
| WO | 2009040634 | 4/2009 |

OTHER PUBLICATIONS

Translation of Chinese Patent Office First Office Action and Search Report for Application No. 201880085419.8 dated May 18, 2021.

\* cited by examiner

DEVICE FOR DETERMINING THE WEIGHT OF A CAPSULE ARRANGED IN A CAPSULE HOLDER OF AN INCREMENTALLY ROTATED CONVEYOR WHEEL

BACKGROUND

The invention relates to a device for determining the weight of a capsule arranged in a capsule holder of an incrementally rotated conveyor wheel. Furthermore, the invention relates to an apparatus for producing capsules filled with a filling material, which apparatus has at least one device according to the invention.

A device of the type in question is known from the applicant's EP 2 389 919 B1. The known device is arranged on the circumference of an incrementally rotated conveyor wheel and is used to determine a tare or net weight and a gross weight of capsules. For this purpose, two devices of the type in question are provided in the region of the conveyor wheel, each of which has a capsule receiver that is designed to receive a plurality of capsules from the capsule holder of the conveyor wheel, the arrangement of the receptacles in the capsule receiver corresponding to the arrangement of receptacles for the capsules in the capsule holder.

The device of the type in question first transfers the capsule receiver with the capsules arranged therein from a transfer position, in which the capsules are transferred from the receptacles of the capsule holder on the conveyor wheel into the receptacles of the capsule receiver, into a position in which the receptacles of the capsule receiver are arranged above weighing receptacles of a weighing cell. Individual capsules are then each transferred from the capsule receiver into weighing receptacles of the weighing cell, the weighing cell being able to infer the weight of each capsule on the basis of the different weights of successive measurement processes. After the capsules have been weighed, they are in turn transferred from the weighing receptacles of the weighing cell into the receptacles of the capsule receiver, which are then brought into alignment with corresponding (empty) receptacles of a capsule holder on the conveyor wheel in order to feed the capsules back into the receptacles of the capsule holder on the conveyor wheel.

The weighing process described so far can take place, by means of the two devices mentioned, both for empty capsules and for filled capsules. In practice, it has been found to be disadvantageous that weighing cells which have a plurality of weighing receptacles, in particular when weighing small masses or small filling quantities, in particular filling weights of less than 100 mg, have relatively high inaccuracies due to the system. The known device is therefore effectively suitable preferably for rapid weighing at relatively high filling weights.

EP 1 582 193 B1 thus discloses a device which comprises a weighing cell having a single weighing receptacle. To transfer a capsule from a conveyor wheel that is rotated continuously, i.e. not incrementally, two transfer devices are provided, each of which is rotatable about an axis, the first transfer device removing a capsule from a semicircular receptacle arranged on the outer circumference of the conveyor wheel and feeding it to the weighing cell or the weighing receptacle, while the other device conveys an already weighed capsule from the weighing receptacle back into a receptacle of the conveyor wheel. The known device only allows one capsule to be removed from or returned to the conveyor wheel at a time.

Finally, it is known from GB 2 269 354 A to also remove a capsule which is arranged in a receptacle on the circumference of the conveyor wheel, in the case of an incrementally rotated conveyor wheel, and, after weighing, to convey it back into an empty receptacle of the conveyor wheel. This device also has a weighing cell having only a single weighing receptacle. The transfer device from the conveyor wheel to the weighing cell and back is structurally complex, however, and requires an additional transfer or pick-up of the capsules from pivotable arms arranged in the region of the conveyor wheel into linear conveyor devices which feed each capsule to the weighing receptacle.

SUMMARY

The device according to the invention for determining the weight of a capsule arranged in a capsule holder of an incrementally rotated conveyor wheel has the advantage that it has an improved weighing accuracy with relatively little design effort, in particular with relatively low capsule weights to be weighed. In particular, the device according to the invention develops the device of the type in question known from EP 2 389 919 B1 such that it can be converted with relatively little effort for high-precision weighing of individual capsules.

According to the invention, for this purpose each receptacle in the capsule receiver with the capsule to be weighed and the (single) weighing receptacle in the weighing cell can be positioned in overlap with one another. In other words, this means that the transfer or pick-up position to be formed individually between the relevant receptacle in the capsule receiver and the weighing receptacle makes it possible to always place the relevant capsule exactly in the same position, i.e. in the weighing receptacle of the weighing cell, irrespective of the position of the receptacle in the capsule receiver. This allows the use of a weighing cell which has a single weighing receptacle and which has a particularly high accuracy with regard to small masses to be weighed of the capsule.

There are fundamentally different options for individually positioning the relevant receptacle in the capsule receiver with respect to the (single) weighing receptacle in the weighing cell: In a first structural design of the device, both the capsule receiver and the weighing receptacle of the weighing cell are arranged so as to each be pivotable about an axis, the two axes being parallel to one another and preferably perpendicular to the horizontal conveyor plane of the conveyor wheel, and the movement path of the receptacles in the capsule receiver when the capsule receiver rotates about one axis and the movement path of the weighing receptacle of the weighing cell about the other axis overlap one another in a transfer and pick-up location for a capsule. Such a design is structurally particularly simple to implement, as both the capsule receiver and the weighing cell or the weighing receptacle of the weighing cell have to be arranged for rotation only about a single axis in each case.

In a structurally different design of the device according to the invention, the weighing receptacle of the weighing cell is stationary, and the capsule receiver is pivotably mounted about an axis which is preferably perpendicular to the horizontal conveyor plane of the conveyor wheel and is additionally arranged so as to be linearly movable. Such a structural design has the advantage that the weighing cell can be designed so as to be particularly simple, since it does not have to be moved in order to position its weighing receptacle in overlap with the corresponding receptacle in the capsule receiver. In particular, such a design allows weighing cells known or available per se from the prior art to be used unchanged with a single weighing receptacle.

In a further development of the last proposal, the linear movement of the capsule receiver is oriented radially with respect to its axis of rotation.

In another alternative structural design of the general inventive concept, the weighing receptacle of the weighing cell is stationary and that the capsule receiver is arranged so to be linearly movable in two axes which are perpendicular to one another and which preferably extend parallel to the conveyor plane of the conveyor wheel. Such a design of the capsule receiver therefore does not require a rotatable arrangement of the capsule receiver, but rather allows said receiver to be positioned anywhere in the horizontal plane, in particular in overlap with the weighing receptacle of the weighing cell and the capsule holder on the conveyor wheel.

Finally, in another alternative structural design of the basic concept according to the invention, the capsule receiver is arranged so to be pivotable about an axis, and in the weighing receptacle of the weighing cell is arranged so as to be linearly movable in two axes which are perpendicular to one another, the axis of the capsule receiver being perpendicular to the horizontal conveyor plane of the conveyor wheel and the two axes of the weighing receptacle extending parallel to the conveyor plane of the conveyor wheel. Such a design makes it possible to position the capsule receiver by rotating it about its axis in the movement range of the weighing receptacle of the weighing cell, which cell, due to its horizontal movability, can bring the weighing receptacle into overlap with the corresponding receptacle in the capsule receiver.

In all of the structural designs of the device according to the invention described so far, a negative-pressure device is preferably used to transfer the capsule from the receptacles of the capsule holder into the receptacles of the capsule receiver and from the weighing receptacle of the weighing cell into the receptacles of the capsule receiver, such that the receptacles in the capsule receiver are coupled to a negative-pressure device, each receptacle being individually controllable.

Furthermore, for better or easier transfer of the capsules, in particular in connection with the negative-pressure device mentioned, the capsule receiver can be additionally arranged so as to be movable perpendicularly to the conveyor plane of the conveyor wheel.

Furthermore, the invention comprises an apparatus for producing capsules filled with a filling material, comprising at least one device which is designed in the manner according to the invention. In particular, the capsules are hard gelatin capsules filled with a pharmaceutical. In this case, an apparatus is preferred in which a single device according to the invention is provided to reduce device-related outlay, which device detects both the net or tare weight of the capsules and the gross weight (with the filling material).

BRIEF DESCRIPTION OF THE DRAWINGS

Further advantages, features and details of the invention can be found in the following description of a preferred embodiment and with reference to the drawings.

In the drawings.

The same elements and/or elements having the same function are provided with the same reference numbers in the drawings.

DETAILED DESCRIPTION

Figure 1:
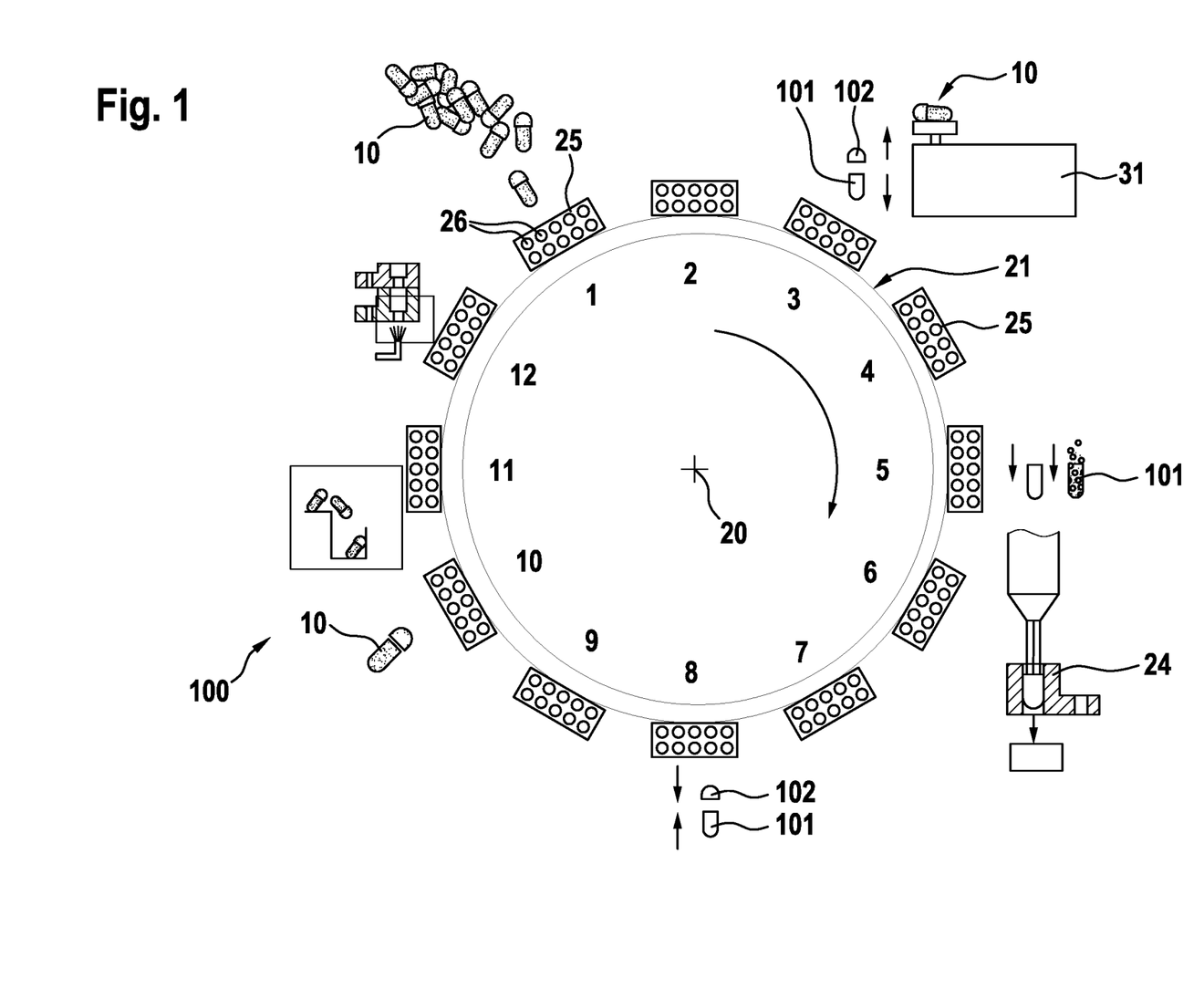
FIG. 1 is a simplified view of an apparatus for producing capsules filled with a pharmaceutical.

FIG. 1 is a highly simplified illustration of an apparatus 100 for filling and closing (hard gelatin) capsules 10 consisting of a lower capsule part 101 and an attached cap 102. The capsules 10 are filled by means of the apparatus 100, in particular by means of a free-flowing pharmaceutical, as filling material; preferably, and not restrictively, relatively small quantities of filling material in the range of 200 mg or less per capsule 10 are provided as filling quantities.

The device 100 has a twelve-part conveyor wheel 21 rotated incrementally about a vertical axis 20, the horizontal conveyor plane of the conveyor wheel 21 extending parallel to the drawing plane of FIG. 1 and perpendicularly to the axis 20. The conveyor wheel 21 comprises stations 1 to 12 on the circulating path of the conveyor wheel 21, at which stations the individual treatment devices are arranged. At station 1, the empty capsules 10 to be filled are placed in an unordered manner and are aligned and arranged in a capsule holder 25 that is interchangeably arranged on the conveyor wheel 21 as a format part. The still-closed capsules 10 are then removed from the capsule holder 25 and weighed using a weighing device 31. The weighed capsules 10 are then replaced in an empty capsule holder 25 and the caps 102 are separated from the lower capsule parts 101. At station 5, filling material is introduced into the capsule lower parts 101. At station 6, a weight control system checks the filling material introduced into the lower capsule parts 101. At station 8, the capsules 10 are closed again. Incorrectly filled capsules 10 are optionally removed at station 10 and finally the capsules 10 identified as correct are discharged or ejected from the conveyor wheel 21 at station 11.

The invention describes the handling of the capsules 10 from a capsule holder 25 into the region of the weighing device 31 and the return of weighed capsules 10 from the weighing device 31 into an empty capsule holder 25. Here, it is also explained that the net or tare weight of the capsules 10 is determined during a first pass or during a first rotation of the conveyor wheel 21. In the event of an optional second pass or a further rotation of the conveyor wheel 21, capsules 10 that have not previously been removed from the conveyor wheel 21 can be weighed again in order to determine the gross weight of the capsules 10 (including the filling material). In this case, the conveyor wheel 21 can be rotated directly to the weighing station 31, i.e. the conveyor wheel 21 skips any other (intermediate) stations 1 to 12 which may be present.

The apparatus 100 comprises a device 50 according to the invention, which has a transfer device 52 for transferring the capsules 10 from receptacles 26 of the capsule holder 25 into receptacles 54 of a capsule receiver 55. For this purpose, the transfer device 52 has push-out pins 56 in the region below the conveyor wheel 21 or a capsule holder 25, which pins can be adjusted from the position shown in FIG. 2 in the direction of the arrow 57 in order to transfer the capsules 10 from the receptacles 26 into the receptacles 54 of the capsule receiver 55 arranged in alignment above the receptacles 26.

Figure 2:
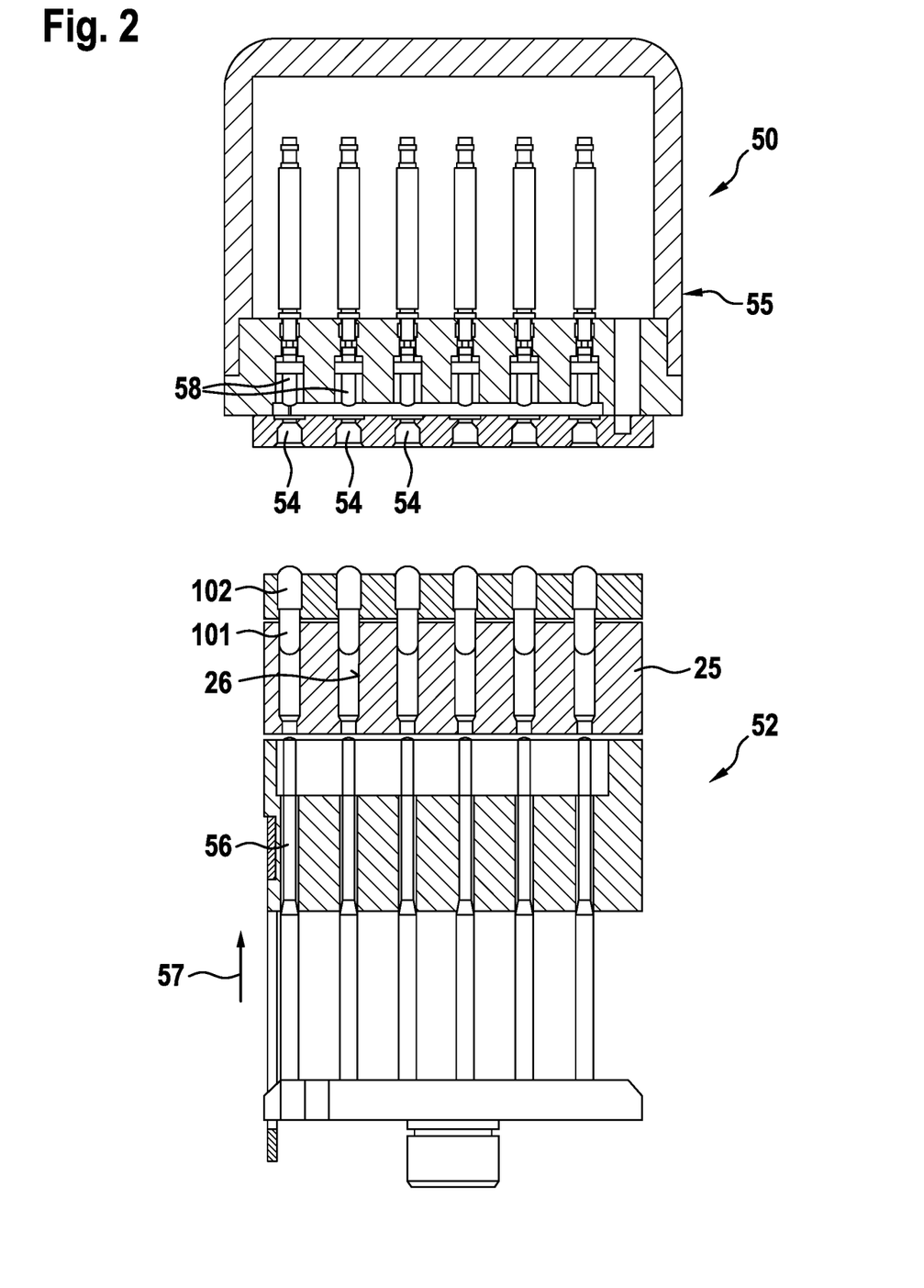
FIG. 2 is a longitudinal section of a device for transferring capsules from a capsule holder of the apparatus according to FIG. 1 into a capsule receiver.

The receptacles 54 are, on the side facing the capsules 10, in turn form-fittingly adapted to the shape of the capsules 10, i.e. are approximately hemispherical, the bases of the receptacles 54 being connected to a negative pressure or vacuum source (not shown) via suction connections 58 (not shown in detail), so that the capsules 10 are held into the receptacles 54 of the capsule receiver 55 by suction.

In addition, it is mentioned that in the embodiment shown, the capsule holder 25 and the capsule receiver 55 each have two rows with five receptacles 26 and 54 arranged at equal intervals from one another. Both the capsule holder 25 and the capsule receiver 55 are, however, interchangeably arranged as format parts on the apparatus 100 or the device 50 in order to be able to adapt these different requirements.

Figure 3:
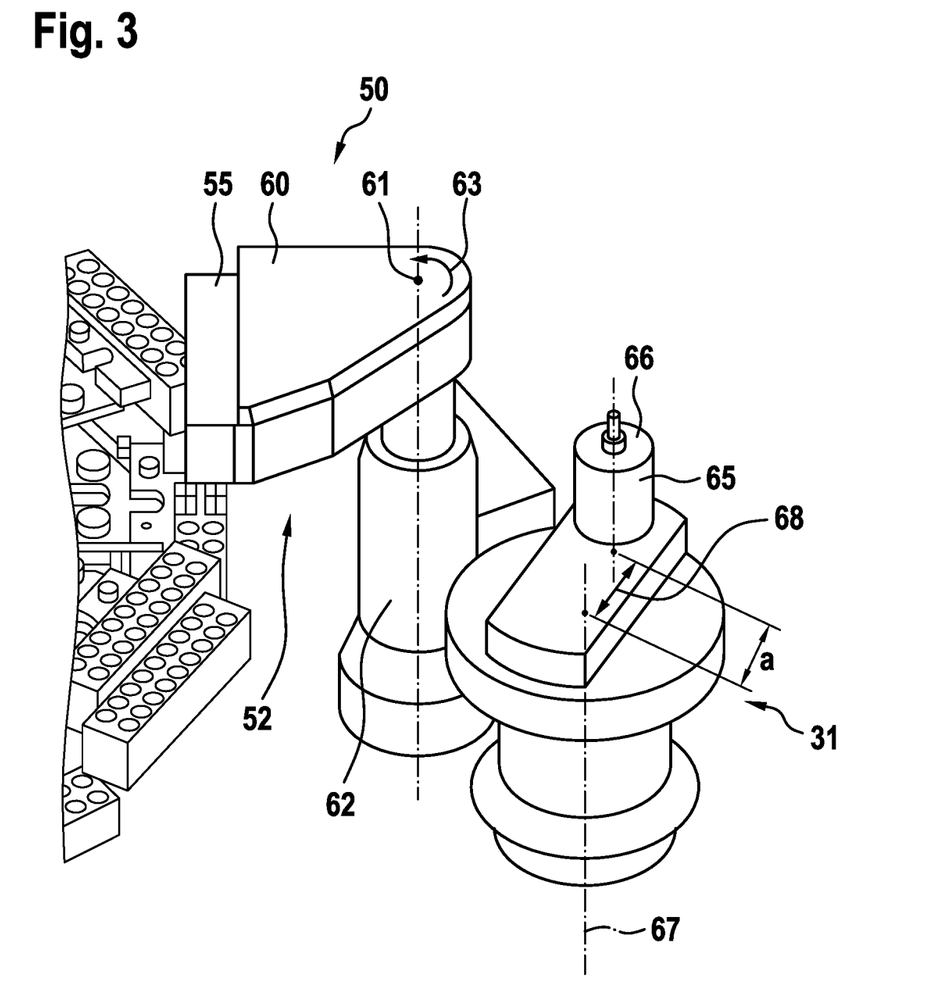
FIG. 3 and FIG. 4 are perspective views of the device of FIG. 1 in the region of a weighing device during different positions of the capsule receiver and FIG. 5 to FIG. 7 are each a perspective view of arrangements modified with respect to FIGS. 3 and 4 to illustrate the different possibilities of movement of a capsule receiver.
Figure 4:
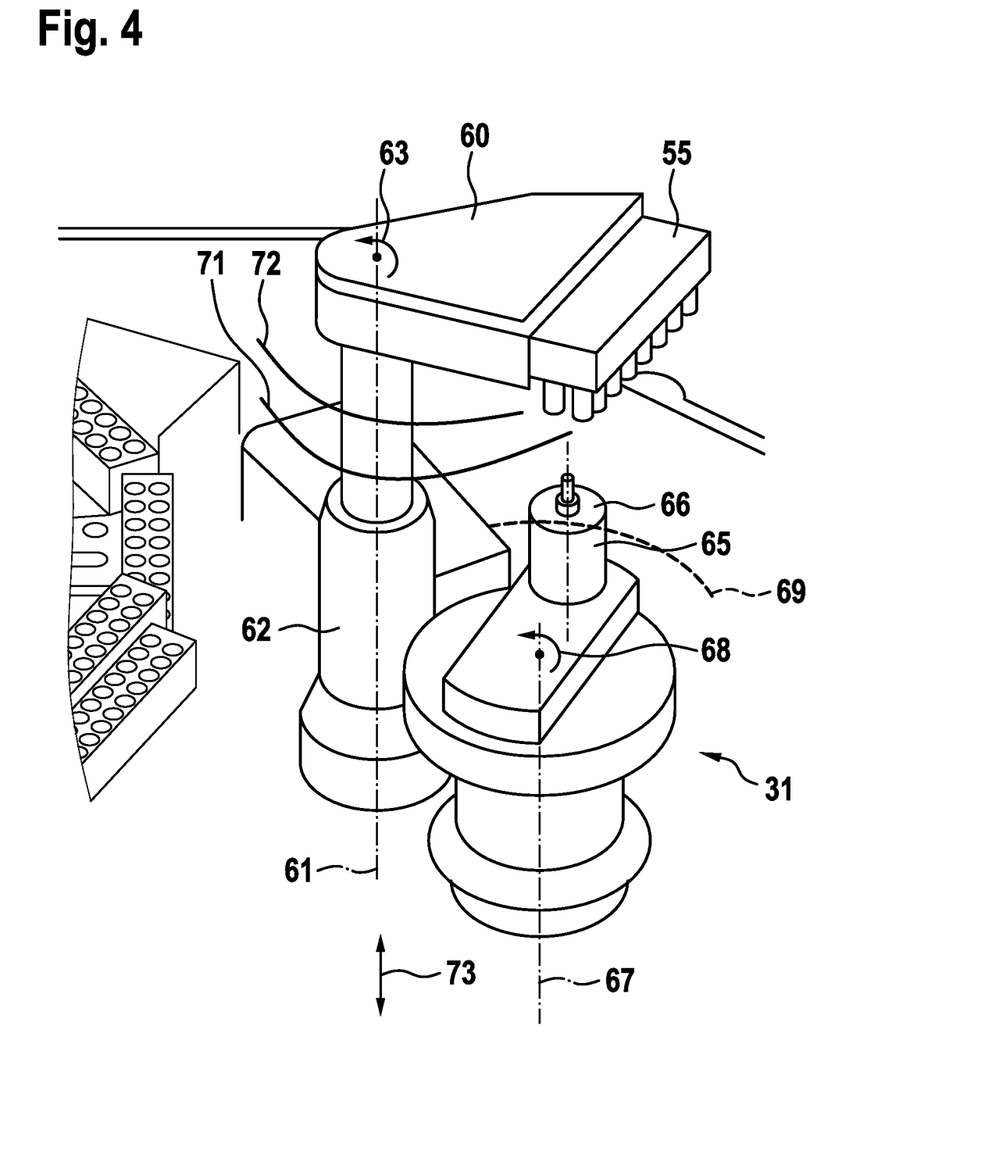

As can be seen particularly clearly from FIGS. 3 and 4, the capsule receiver 55 is fastened to one end of a support arm 60. The support arm 60 is in turn arranged in a first pivot axis 61 in the region of a column 62 so as to be rotatable or pivotable in the direction of the double arrow 63. It can also be seen from FIGS. 3 and 4 that the weighing device 31 comprises a weighing cell 65 having a single weighing receptacle 66. The weighing receptacle 66 and the weighing cell 65 are thus designed to receive a single capsule 10 and to determine its weight, respectively. It can also be seen from FIGS. 3 and 4 that the weighing cell 65 is arranged at a distance a from a second pivot axis 67, the weighing cell 65 being pivotable about the second pivot axis 67 in the direction of the double arrow 68.

When the weighing cell 65 or the weighing receptacle 66 is pivoted about the second pivot axis 67 (the second pivot axis 67 being arranged parallel to the first pivot axis 61 and perpendicular to the horizontal conveyor plane of the conveyor wheel 21), the weighing receptacle 66 moves along a (circular) movement path 69 corresponding to the distance a from the second pivot axis 67. Furthermore, the individual receptacles 54 of the capsule receiver 55 of the two rows of receptacles 54 are moved along movement paths 71, 72 when rotating about the first pivot axis 61, corresponding to the distance of the receptacles 54 from the first pivot axis 61. By means of a corresponding combination of the rotation angle position of the weighing receptacle 66 with respect to the second pivot axis 67 and the corresponding receptacle 54 of the capsule receiver 55 with respect to the first pivot axis 61, a position can be set for each receptacle 54 in the capsule receiver 55 in which the receptacle 54 is arranged in alignment above the weighing receptacle 66. This is shown in FIG. 4. It can also be seen from FIG. 4 that the column 62 and thus also the capsule receiver 55 can be raised and lowered in the direction of the double arrow 73, in order to place or position the relevant capsule 10 onto the weighing receptacle 66. When the relevant capsule 10 is placed onto the weighing receptacle 66, the negative pressure mentioned, which holds the capsule 10 in the relevant receptacle 54, is selectively deactivated.

After the relevant capsule 10 has been weighed, the corresponding receptacle 54 of the capsule receiver 55 is again brought into overlap with the capsule 10, and by lowering the receptacle 54 and activating the corresponding negative pressure or vacuum source, the capsule 10 can be sucked into the receptacle 54 of the capsule receiver 55. Subsequently, after all capsules 10 of the capsule receiver 55 have been weighed, the capsules 10 are in turn brought into overlap with a capsule holder 25 on the conveyor wheel 21, in the receptacles 24 of which capsule holder there are no capsules 10, in order to transfer the capsules 10 to the receptacles 24 of the capsule holder 25.

Figure 5:
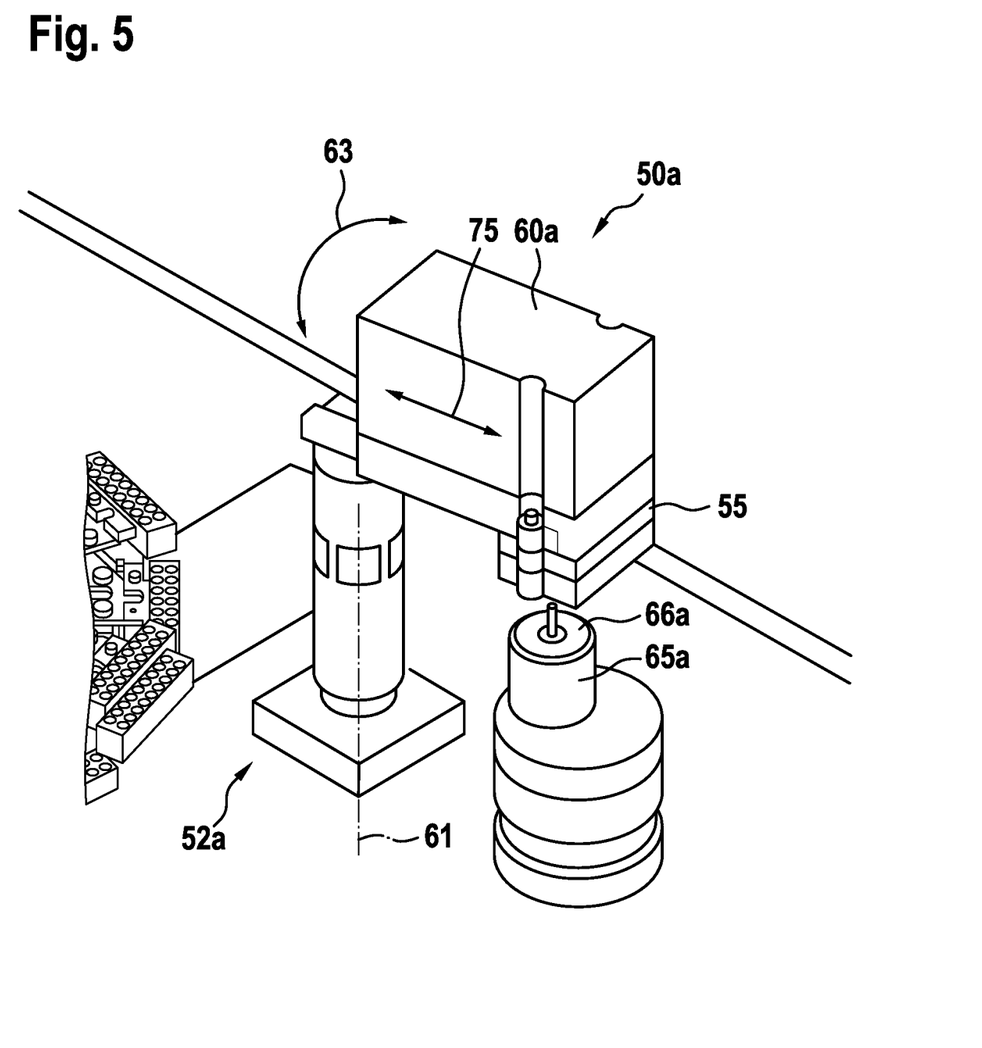

The device 50a shown in FIG. 5 differs from the device 50 in that the weighing cell 65a and the weighing receptacle 66a are stationary. In contrast, the transfer device 52a has a support arm 60a which is arranged so as to be pivotable not only about the first pivot axis 61 in the direction of the double arrow 63, but also linearly in the radial direction with respect to the first pivot axis 61 in the direction of the double arrow 75. Even with such a configuration of the device 50a, an aligned arrangement of each receptacle 54 of the capsule receiver 55 in relation to the stationary weighing receptacle 66a can be achieved.

Figure 6:
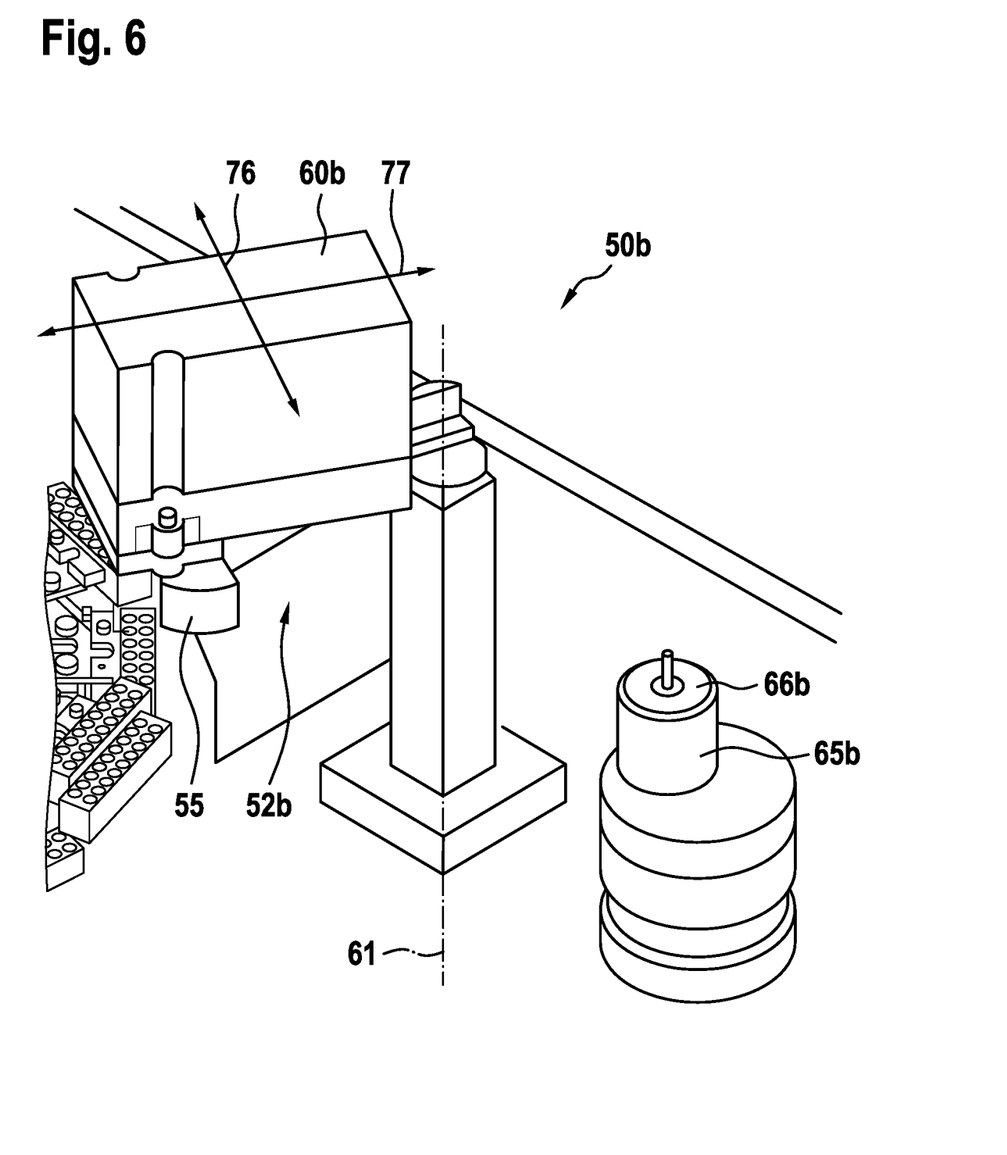

In contrast, the device 50b shown in FIG. 6 having the transfer device 52b has, in addition to optional pivotability about the first pivot axis 61, a support arm 60b which is arranged so as to be movable in the horizontal plane in the direction of the two axes 76, 77 arranged perpendicularly to one another, i.e. parallel to the conveyor plane of the conveyor wheel 21, so that it is also possible by means of the device 50b to bring the relevant receptacle 54 of the capsule receiver 55 into overlap with the stationary weighing receptacle 66b of the weighing cell 65b.

Figure 7:
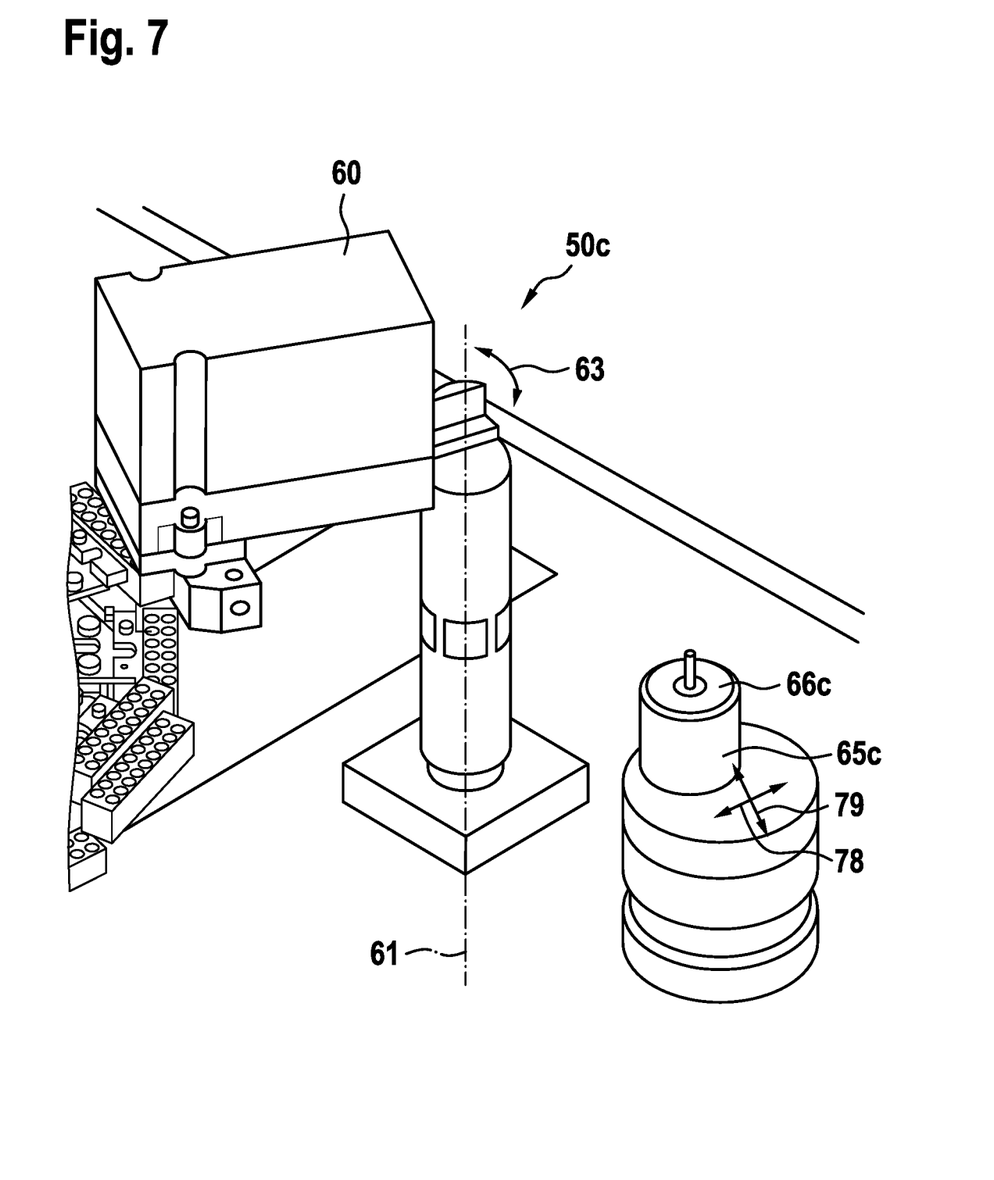

Finally, FIG. 7 shows the case in which the device 50c with the transfer device 52c has a support arm 60 which can be pivoted about the first pivot axis 61, corresponding to the device 50. In contrast, the weighing cell 65c is arranged so as to be adjustable in the direction of the two axes 78, 79 arranged perpendicularly to one another parallel to the conveyor plane of the conveyor wheel 21 in order to allow the relevant receptacle 54 of the capsule receiver 55 to overlap with the weighing receptacle 66c of the weighing cell 65c.

The devices 50, 50a to 50c and the apparatus 100 described so far can be altered or modified in many different ways without deviating from the inventive concept. For example, it is conceivable to hold the capsules 10 in the receptacle 54 not by means of negative pressure, but in a mechanical manner, in particular by clamping.

The invention claimed is:

1. A device (50; 50a to 50c) for determining the weight of a capsule (10) arranged in a receptacle (26) of a capsule holder (25) of an incrementally rotated conveyor wheel (21), comprising a transfer device (52; 52a to 52c) for transferring at least one capsule (10) from the capsule holder (25) into a capsule receiver (55) having a plurality of receptacles (54) for one capsule (10) respectively, and back again, the capsule receiver (55) being movably arranged in a plane parallel to the conveyor plane of the conveyor wheel (21), characterized in that a weighing cell (65; 65a to 65c) having a single weighing receptacle (66; 66a to 66c) is provided for a capsule (10), and in that each receptacle (54) in the capsule receiver (55) having the capsule (10) to be weighed and the single weighing receptacle (66; 66a to 66c) of the weighing cell (65; 65a to 65c) can be positioned in overlap with one another.

2. The device according to claim 1, characterized in that
both the capsule receiver (55) and the weighing receptacle (66) of the weighing cell (65) are mounted so as to each be pivotable about an axis (61, 67), the two axes (61, 67) being parallel to one another and perpendicular to the conveyor plane of the conveyor wheel (21), and it being possible to position movement paths (71, 72) of the receptacles (54) in the capsule receiver (55) when the capsule receiver (55) rotates about one axis (61) and a movement path (69) of the weighing receptacle (66) about the other axis (67) in overlap.

3. The device according to claim 1,
characterized in that
the weighing receptacle (66a) of the weighing cell (65a) is stationary, and in that the capsule receiver (55) is arranged so as to be pivotable about an axis (61) which is perpendicular to the conveyor plane of the conveyor wheel (21), and also so as to be linearly movable in at least one direction.

4. The device according to claim 3,
characterized in that
the linear movement is oriented radially with respect to the axis (61).

5. The device according to claim 1,
characterized in that
the weighing receptacle (66b) of the weighing cell (65b) is stationary, and in that the capsule receiver (55) is arranged so to be linearly movable in two axes (76, 77) which are perpendicular to one another and which extend parallel to the conveyor plane of the conveyor wheel (21).

6. The device according to claim 1,
characterized in that
the capsule receiver (55) is arranged so to be pivotable about an axis (61), and in that the weighing receptacle (66c) of the weighing cell (65c) is arranged so as to be linearly movable in two axes (78, 79) which are perpendicular to one another, the axis (61) of the capsule receiver (55) being perpendicular to the conveyor plane of the conveyor wheel (21) and the two axes (78, 79) of the weighing receptacle (66c) extending parallel to the conveyor plane of the conveyor wheel (21).

7. The device according to claim 1,
characterized in that
the capsule receiver (55) is additionally arranged so to be movable perpendicularly to the conveyor plane of the conveyor wheel (21).

8. The device according to claim 1,
characterized in that
the receptacles (54) in the capsule receiver (55) are coupled to a negative-pressure device.

9. The device according to claim 1,
characterized in that
the capsule holder (25) is designed as a format part which has a plurality of receptacles (26) for one capsule (10) respectively and which is interchangeably arranged on the conveyor wheel (21).

10. An apparatus (100) for producing capsules (10) filled with a filling material and at least one device (50; 50a to 50c), which is designed according to claim 1.

11. The apparatus according to claim 10,
characterized in that
a single device (50; 50a to 50c) is provided which detects both the net weight and the gross weight of the capsule (10).

12. The device according to claim 1,
characterized in that
both the capsule receiver (55) and the weighing receptacle (66) of the weighing cell (65) are mounted so as to each be pivotable about an axis (61, 67), the two axes (61, 67) being parallel to one another, and it being possible to position movement paths (71, 72) of the receptacles (54) in the capsule receiver (55) when the capsule receiver (55) rotates about one axis (61) and a movement path (69) of the weighing receptacle (66) about the other axis (67) in overlap.

13. The device according to claim 1,
characterized in that
the weighing receptacle (66a) of the weighing cell (65a) is stationary, and in that the capsule receiver (55) is arranged so as to be pivotable about an axis (61), and also so as to be linearly movable in at least one direction.

14. The device according to claim 1,
characterized in that
the weighing receptacle (66b) of the weighing cell (65b) is stationary, and in that the capsule receiver (55) is arranged so to be linearly movable in two axes (76, 77) which are perpendicular to one another.

* * * * *